United States Patent
Dossmann et al.

(10) Patent No.: US 12,435,747 B2
(45) Date of Patent: Oct. 7, 2025

(54) BREAK-OFF BOLT WITH TORQUE-LIMITING SECTION

(71) Applicant: Tyco Electronics—Simel, Gevrey-Chambertin (FR)

(72) Inventors: Julien Dossmann, Gevrey-Chambertin (FR); Bruno Peltier, Gevrey-Chambertin (FR); Laurent Petrignet, Gevrey-Chambertin (FR)

(73) Assignee: TYCO ELECTRONICS—SIMEL, Gevrey-Chambertin (FR)

( * ) Notice: Subject to any disclaimer, the term of this patent is extended or adjusted under 35 U.S.C. 154(b) by 241 days.

(21) Appl. No.: 17/585,181

(22) Filed: Jan. 26, 2022

(65) Prior Publication Data

US 2022/0145923 A1 May 12, 2022
US 2024/0418199 A9 Dec. 19, 2024

Related U.S. Application Data

(63) Continuation of application No. PCT/EP2020/071081, filed on Jul. 27, 2020.

(30) Foreign Application Priority Data

Jul. 30, 2019 (EP) .................................... 19305988

(51) Int. Cl.
*F16B 31/02* (2006.01)
*F16B 35/00* (2006.01)
(Continued)

(52) U.S. Cl.
CPC .......... *F16B 31/021* (2013.01); *F16B 35/005* (2013.01); *H01R 4/307* (2013.01); *H01R 4/36* (2013.01)

(58) Field of Classification Search
CPC ....... F16B 31/02; F16B 31/021; F16B 31/027
(Continued)

(56) References Cited

U.S. PATENT DOCUMENTS 3,428,377 A * 2/1969 Christian ............... B60B 27/023
411/929
3,489,195 A * 1/1970 Mortus .................. B21H 3/025
411/301
(Continued)

FOREIGN PATENT DOCUMENTS

DE 102015102223 A1 8/2016
EP 2381534 A1 10/2011
(Continued)

OTHER PUBLICATIONS

Extended European Search Report, App. No. 19305988.8, dated Jan. 21, 2020, 5 pages.
(Continued)

*Primary Examiner* — Flemming Saether

(57) ABSTRACT

A break-off bolt for securing a conductor within a connector includes a first thread section, a second thread section and a torque-limiting section arranged between the first thread section and the second thread section. The first thread section and the second thread section comprise the same external thread having a minor diameter. The torque-limiting section has at least one of no thread with an outer diameter larger than the minor diameter of the external thread or an external thread having a minor diameter larger than the minor diameter of the external thread of the first and second thread sections.

13 Claims, 4 Drawing Sheets

(51) Int. Cl.
*H01R 4/30* (2006.01)
*H01R 4/36* (2006.01)

(58) Field of Classification Search
USPC .................................... 411/1, 3, 5, 8, 9, 397
See application file for complete search history.

(56) References Cited

U.S. PATENT DOCUMENTS

| | | | | |
|---|---|---|---|---|
| 3,731,725 | A * | 5/1973 | Brophy | F16B 39/30 |
| | | | | 411/938 |
| 4,199,216 | A | 4/1980 | Gryctko | |
| 4,930,962 | A * | 6/1990 | Reynolds | F16B 35/00 |
| | | | | 411/397 |
| 5,857,816 | A * | 1/1999 | Assmundson | F16B 31/02 |
| | | | | 411/1 |
| 6,619,888 | B2 * | 9/2003 | Calandra, Jr. | E21D 21/0086 |
| | | | | 405/259.6 |
| 8,425,265 | B2 * | 4/2013 | Stauch | H01R 4/363 |
| | | | | 439/814 |
| 9,366,282 | B2 * | 6/2016 | Vallette | F16B 31/02 |
| 10,573,979 | B2 * | 2/2020 | Toivanen | F16B 31/021 |
| 11,092,185 | B2 * | 8/2021 | Peltier | F16B 31/021 |
| 11,258,188 | B2 * | 2/2022 | Toivanen | H01R 4/56 |
| 2009/0196708 | A1 | 8/2009 | Stauch et al. | |

FOREIGN PATENT DOCUMENTS

| | | |
|---|---|---|
| EP | 2657548 A2 | 10/2013 |
| EP | 2846052 A1 | 3/2015 |
| EP | 3388696 A1 | 10/2018 |
| WO | 03067102 A1 | 8/2003 |

OTHER PUBLICATIONS

PCT Notification, The International Search Report and The Written Opinion of the International Searching Authority, Intl App. No. PCT/EP2020/071081, dated Oct. 5, 2020, 13 pages.

* cited by examiner

BREAK-OFF BOLT WITH TORQUE-LIMITING SECTION

CROSS-REFERENCE TO RELATED APPLICATIONS

This application claims the benefit of PCT Application No. PCT/EP2020/071081 filed on Jul. 27, 2020, the whole disclosure of which is incorporated herein by reference in its entirety.

FIELD OF THE INVENTION

The present disclosure relates to fasteners, and more particularly, to a break-off bolt for securing a conductor, such as a wire or cable, within a connector.

BACKGROUND

Break-off bolts are often used for securing a conductor within a connector or connecting two electrical conductors with one another, for example, in medium or high voltage technology. Break-off bolts are formed so that a excess length thereof may be sheared off. Consequently, the bolt will not protrude beyond an outer surface of the connector after the installation. To achieve and maintain an electrically well-conducting contact, the break-off bolt needs to be screwed into the connector with a predetermined torque. The predetermined torque may be ensured by using a torque wrench. However, torque wrenches are quite specific tools which are often not available on an installation site.

Therefore, it is an object of the invention to provide a simple break-off bolt that can be easily installed.

SUMMARY

According to an embodiment of the present disclosure, a break-off bolt for securing a conductor within a connector includes a first thread section, a second thread section and a torque-limiting section arranged between the first thread section and the second thread section. The first thread section and the second thread section comprise the same external thread having a minor diameter. The torque-limiting section has at least one of no thread with an outer diameter larger than the minor diameter of the external thread or an external thread having a minor diameter larger than the minor diameter of the external thread of the first and second thread sections.

BRIEF DESCRIPTION OF THE DRAWINGS

The invention will now be described by way of example with reference to the accompanying Figures, of which.

DETAILED DESCRIPTION OF THE EMBODIMENTS

Figure 2:
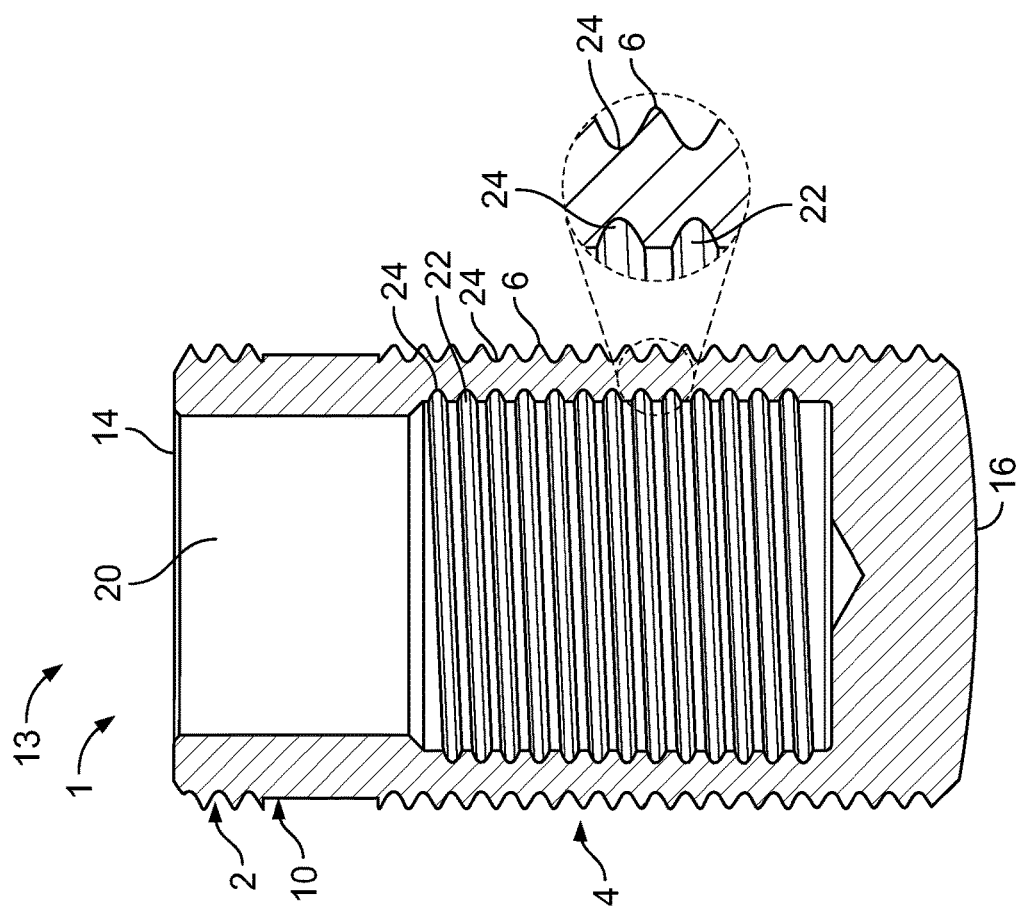
FIG. 2 shows a schematic cut view of the first embodiment of the inventive break-off bolt.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the following description, the term "bolt" may be used in place of the term "break-off bolt" in the interest of brevity.

Figure 1:
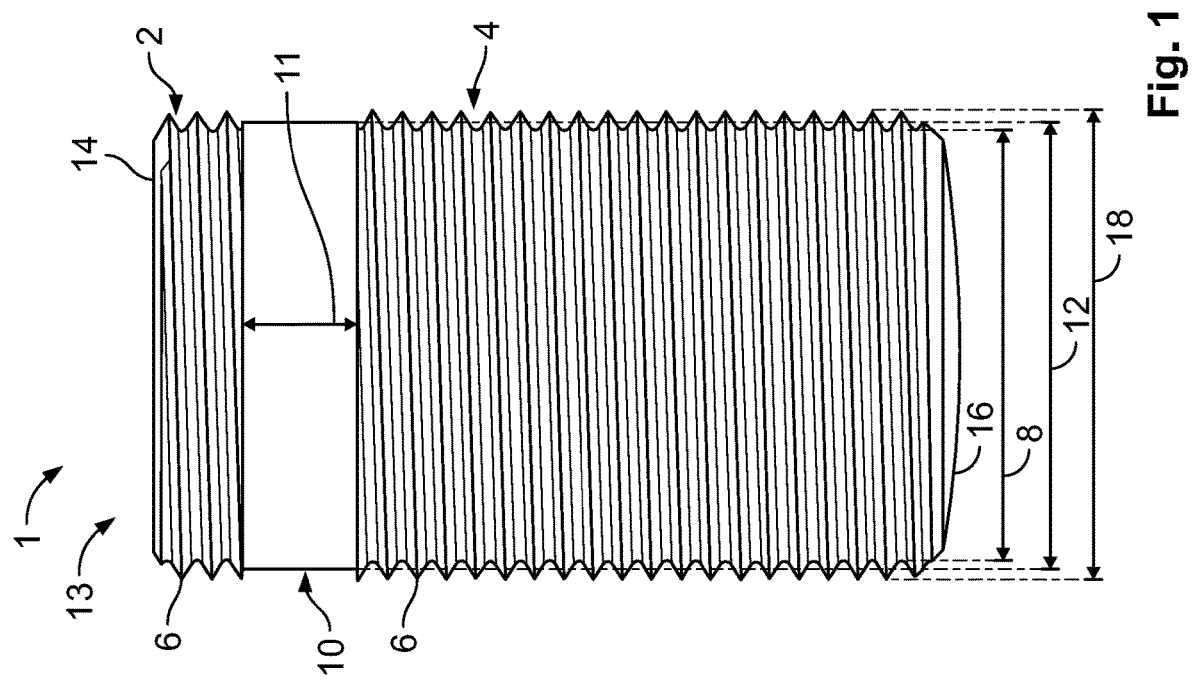
FIG. 1 shows a schematic perspective view of a first embodiment of the break-off bolt according to the invention.

A first embodiment of a bolt 1 is illustrated in FIGS. 1 and 2. The bolt 1 extends along a longitudinal axis L and comprises a first thread section 2 and a second thread section 4. The first thread section 2 and the second thread section 4 comprise an external thread 6 with a minor diameter 8. The bolt 1 further comprises a torque-limiting section 10 extending along the longitudinal axis L between the first thread section 2 and second thread section 4, wherein, in the torque-limiting section 10, the bolt 1 has no thread having a larger diameter 12 than the minor diameter 8 of the first and second thread section 2, 4.

The bolt 1 may preferably be composed of a sufficiently strong, preferably well-conducting material, such as aluminum or an aluminum alloy. The first thread section 2, the second thread section 4 and the torque-limiting section 10 may be formed integrally with one another as a monolithic component 13. The external thread 6 of the first and second thread section 2, 4 may extend to a respective free end 14, 16 arranged opposite each other along the longitudinal axis L. The length of the first thread section 2 from the free end 14 to the torque-limiting section 10 may be sufficient such that a nut, preferably a standardized nut, can engage the external thread 6 of the first thread section 2 without falling off the bolt 1. As a result, the nut can be easily screwed onto the first thread section 2. The first thread section 2 may, for example, comprise a thread with about two pitches. Therefore, material for the first thread section 2 may be saved.

The torque-limiting section 10 may be arranged directly adjoining the first thread section 2 and the second thread section 4. The torque-limiting section 10 may comprise a length 11 along the longitudinal axis L smaller than a thickness of the nut, particularly the standardized nut. When the nut travels down the torque-limiting section 10, the nut may simultaneously engage the external thread 6 of the first thread section 2 and the second thread section 4. As a result, a smooth transition of the nut from the first thread section 2 to the second thread section 4 may be achieved.

The smooth transition of the nut from the first thread section 2 to the second thread section 4 may be further enhanced by having the external thread 6 of the second thread section 4 be a continuation of the external thread 6 of the first thread section 2. For example, the pitch of the external thread 6 at the first thread section 2 and the second thread section 4 may be the same. The lead angle of the external thread 6 may be the same at the first and second thread section 2, 4. Tilting of the nut may be prevented due to the external thread 6 of the second thread section 4 being a continuation of the external thread 6 of the first thread section 2.

The entire torque-limiting section 10 may comprise no thread and may have a constant outer diameter 12 along the longitudinal axis L, further simplifying the bolt 1 and thereby reducing the manufacturing costs and increasing the production efficiency. The outer diameter 12 of the torque-limiting section 10 may preferably be smaller than the major diameter 18 of the external thread 6 of the first and second thread section 2, 4. The predetermined torque at which the nut may be rotationally decoupled from the bolt 1 and may travel down the torque-limiting section 10 towards the second thread section 4 may be calibrated depending on the outer diameter 12 of the torque-limiting section 10. A higher predetermined torque may be set by having the outer diameter 12 of the torque-limiting section 10 closer to the major diameter 18 and vice versa, a lower predetermined torque may be set by having the outer diameter 12 closer to the minor diameter 8. The predetermined torque may be set to the torque necessary for installation of the bolt 1 in the connector. The predetermined torque may, for example, be about 32 Nm. However, depending on the installation requirements of the application, any other torque could be set as the predetermined torque.

As can be seen in FIG. 1, the bolt 1 does not define an intended shearing section, as the distance of the shearing along the longitudinal axis L from the free end 16 of the second thread section 4 may vary depending on the application. Therefore, the bolt 1 may be flexible and be used for different applications, such as connecting a conductor within a connector with different conductor sizes.

FIG. 2 shows a cut view of the bolt 1 shown in FIG. 1. The bolt 1 may be hollow, comprising a cavity 20 that extends along the longitudinal axis at least partially from the second thread section 4 to the free end 14 of the first thread section 2 and opening towards the free end 14. Consequently, the bolt 1 may be thin-walled, reducing the shearing force necessary to break or shear the bolt 1. The cavity 20 may increase in width at the second thread section 4 in comparison to the cavity 20 in the first thread section 2 and/or torque-limiting section 10. This may prevent an unintentional breakage of the bolt 1 at the first thread section 2 and/or the torque-limiting section 10. The free end 16 of the second thread section 4 may be solid, so that the free end 16 may be adapted to lie flat on the wire and/or cable pressing against them with surface pressure. The surface pressure may be distributed along a larger contact area. At least in the second thread section 4 the cavity 20 may comprise an internal thread 22 having grooves 24 that further decrease the wall thickness of the bolt 1, particularly at least at the second thread section 4, further reducing the torque needed for breaking, especially shearing, the bolt 1.

As depicted in the detailed view in FIG. 2, the internal thread 22 may be different to the external thread 6. For example, the internal thread 22 may have a counter helicoid compared to the external thread 6. In other words, the grooves 24 of the internal thread 22 may run parallel to the grooves 24 of the external thread 6, reducing the wall thickness of the bolt 1. The internal thread 20 may comprise at least one of a different lead angle, crest angle and pitch. The internal thread 20 may allow for a cleaner break at the top of the remaining bolt 1 after it has been sheared off by the nut compared to a thin walled, hollow bolt 1 without an internal thread 20. According to this exemplary embodiment, the bolt 1 may be sheared off at any point along the longitudinal axis L. Consequently, the bolt 1 may be used for different applications and is independent from the diameter of the wire and/or connector.

Figure 4:
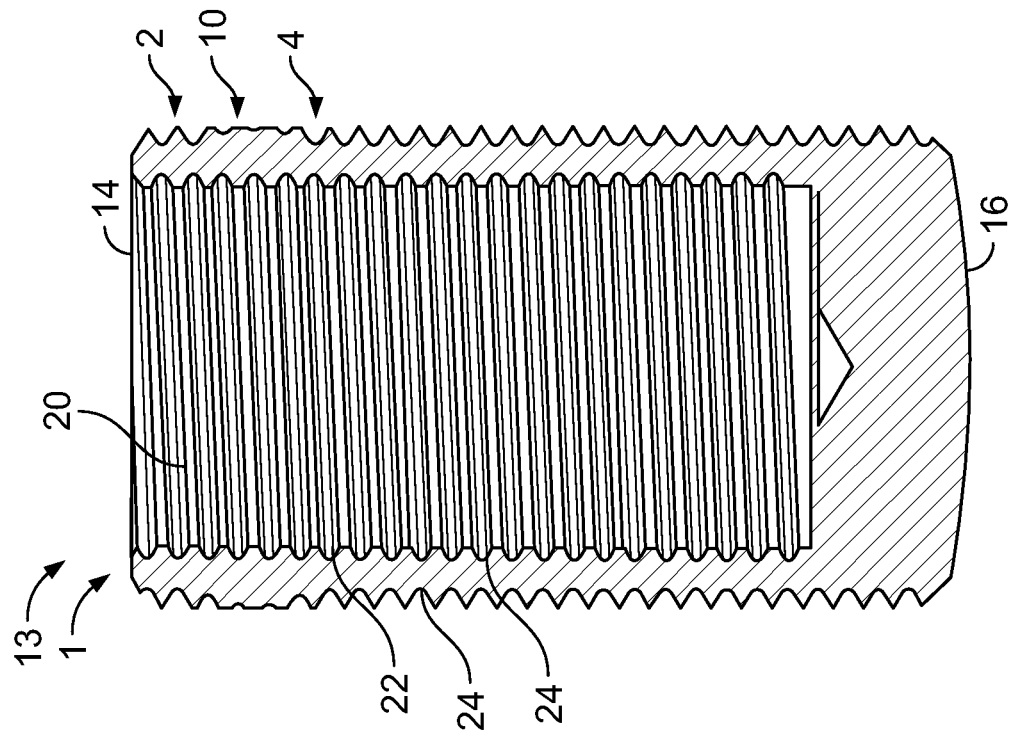
FIG. 4 shows a schematic cut view of the second embodiment of the break-off bolt according to the invention.
Figure 3:
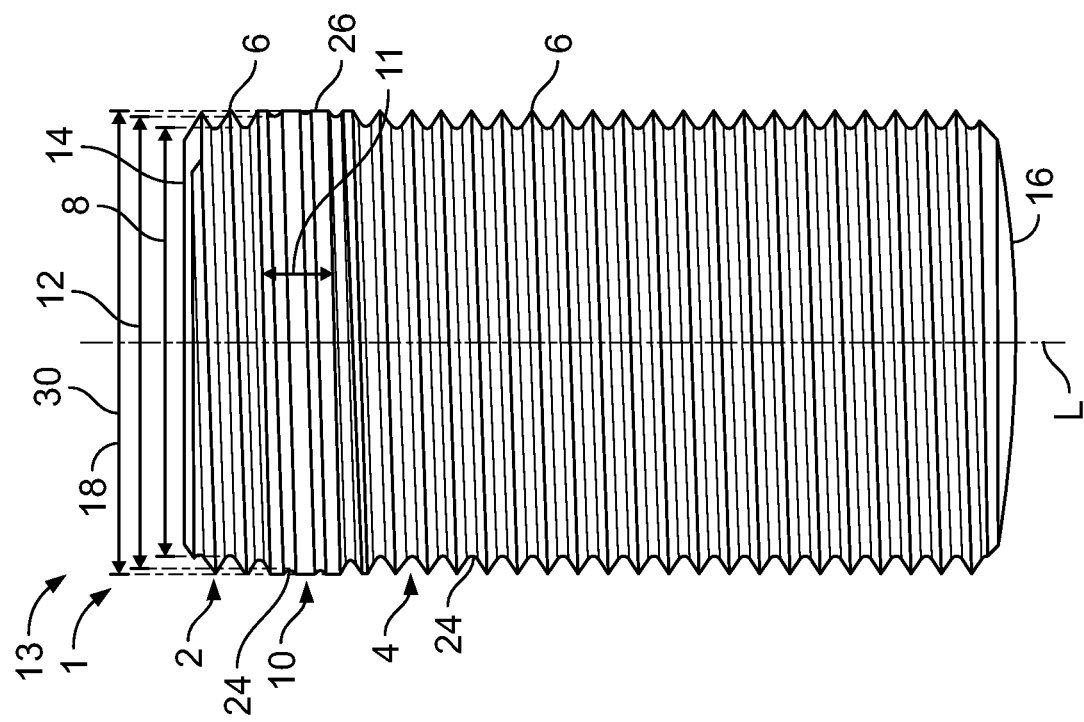
FIG. 3 shows a schematic perspective view of a second embodiment of the break-off bolt according to the invention.

A second exemplary embodiment is illustrated in FIGS. 3 and 4. In contrast to the first embodiment, the bolt 1 comprises a torque-limiting section 10 with an external thread 26, wherein the external thread 26 of the torque-limiting section 10 comprises a larger minor diameter 28 than the minor diameter 18 of the external thread 6 at the first and second thread section 2, 4. The additional material of the bolt 1 in the grooves 24 of the external thread 26 compared to the grooves 24 of the external thread 6 may serve as a thread lock preventing the nut from travelling down the torque-limiting section 10 until the predetermined torque for installing the bolt 1 in the connector is surpassed. The major diameter 18 of the external thread 6 may be the same as a major diameter 30 of the external thread 26. The external thread 26 at the torque-limiting section 10 may be a continuation of the external thread 6 of the first thread section 2 and/or second thread section 4. Therefore, the nut is always engaged to an external thread 6, 26 and tilting of the nut may be prevented, while being screwed onto the bolt 1.

The bolt 1 in the second embodiment can also be hollow as can be seen in FIG. 4. In contrast to FIG. 2, the internal thread 22 may extend along the entire cavity 20. This may facilitate the production of the bolt 1. However, it should be noted that the second embodiment may also comprise an internal thread 22 that only partly extends along the cavity 20, such as in FIG. 2. Accordingly, the first embodiment may also comprise an internal thread 22 that extends along the entire cavity 20.

A break-off assembly 32 comprising a bolt 1 and a nut 34 is shown in FIGS. 5 to 11. The nut 34 is adapted to engage the external thread 6 and may be a standardized nut. However, the nut 34 may comprise a pedestal 36 with a lower diameter than the remainder of the nut 34, wherein the pedestal 36 may extend along the longitudinal axis L further towards the free end 16 of the second thread section 4 for abutment with a connector 38. Therefore, the remainder of the nut 34 is elevated beyond an outer surface 40 of the connector 38, so that the connector 38 does not block the movement of a tightening tool. Particularly, the remainder of the nut 34 may have the same dimensions of a standardized nut.

A contact assembly 42 may comprise at least one bolt 1 and a connector 38. The connector 38 may extend along a horizontal axis H perpendicular to the longitudinal axis L of the at least one bolt 1 and may be formed as a hollow pipe 44 comprising at least one bore 46 for receiving the at least one bolt 1. The at least one bore 46 may extend radially through a wall 48 of the pipe shaped connector 38, allowing access of the at least one bolt 1 into the hollow space 50 of the connector 38. At least one conductor 52, such as a cable and/or wire, may be arranged in the hollow space 50 extending along the horizontal axis H. The connector 38 may comprise an electrically conductive material such as aluminum or an aluminum alloy.

Figure 5:
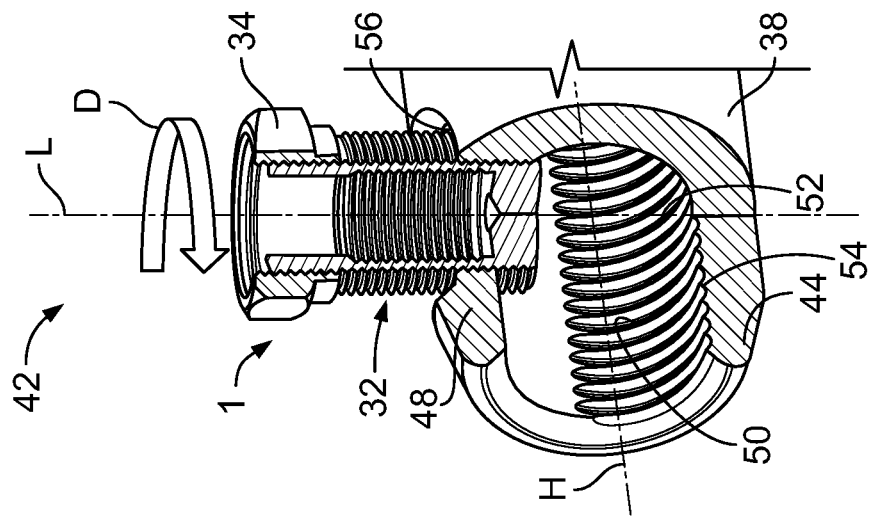
FIGS. 5 to 11 show schematic perspective views of different positions of the break-off bolt according to the invention during installation.
Figure 6:
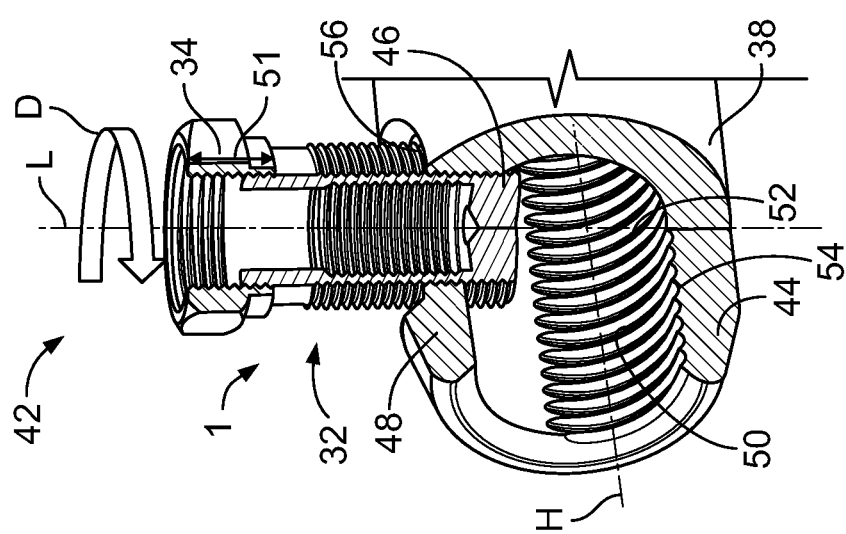
Figure 7:
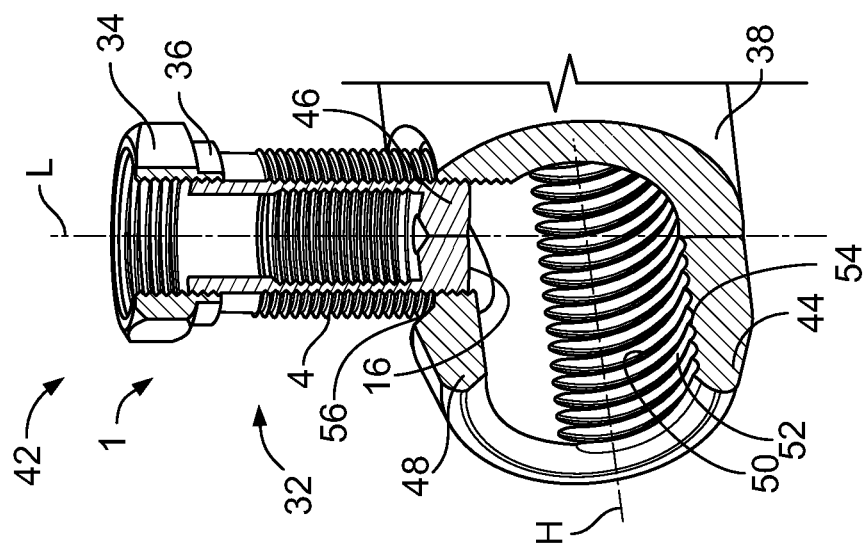

FIG. 5 shows the bolt 1 intact in an initial position, in which the nut 34 is screwed onto the first thread section 2 until the nut 34 reaches the torque-limiting section 10. The torque-limiting section 10 blocks further movement of the nut 34 relative to the bolt 1 coupling the nut 34 and the bolt 1 in a rotationally rigid manner in a winding direction D for installing the bolt 1. Therefore, the torque applied to the nut 34 is directly transferred to the bolt 1 screwing the bolt 1 into the bore 46 (FIG. 6). Once the predetermined torque, preferably the required installation torque of the contact assembly 42, is surpassed, the nut 34 may cut into the additional material at the torque-limiting section 10. Consequently, the nut 34 may be rotationally decoupled from the bolt 1 and may travel down the torque-limiting section 10 and engage the external thread 6 of the second thread section 4, as shown in FIG. 7. The torque-limiting section 10 may preferably have a length 11 along the longitudinal axis L that is smaller than the thickness 51 of the nut 34, so that the nut 34 may simultaneously engage the external threads of the first and second thread section, preventing tilting of the nut further increasing the installation efficiency of the bolt 1 or break-off assembly. The free end 16 of the second thread section 4 presses against the conductor 52, so that the conductor 52 is clamped between the bolt 1 and an inner surface 54 of the connector wall 48.

Figure 8:
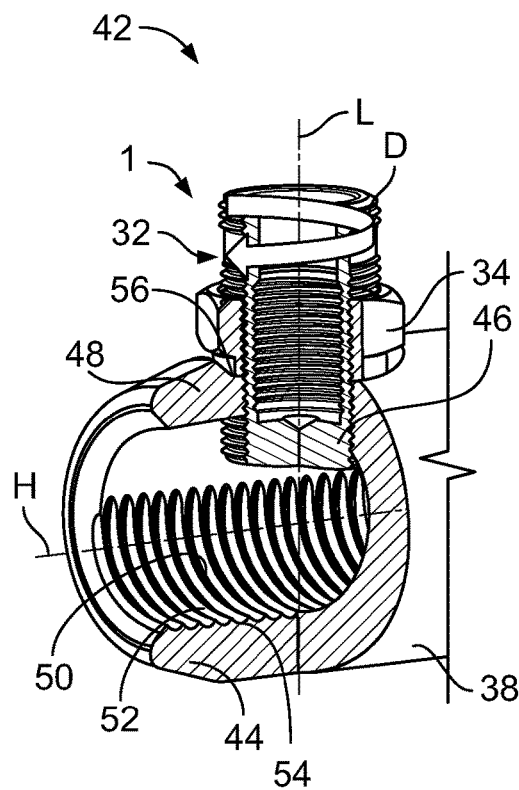
Figure 9:
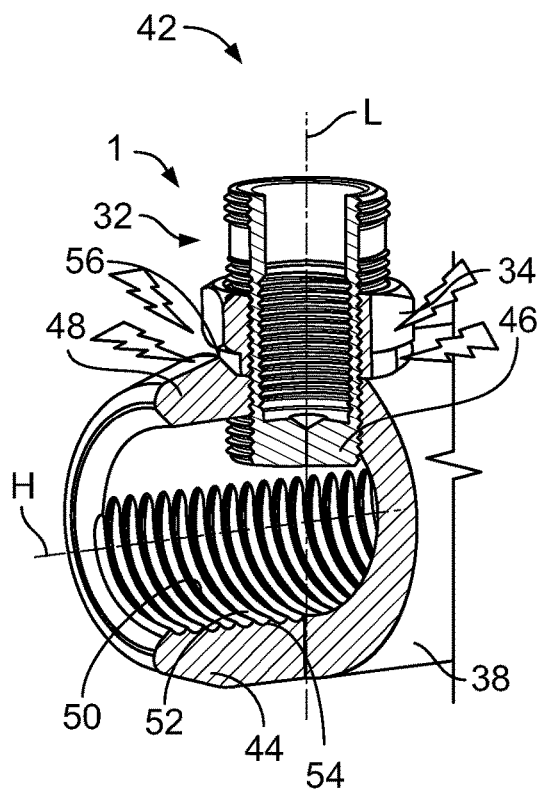
Figure 10:
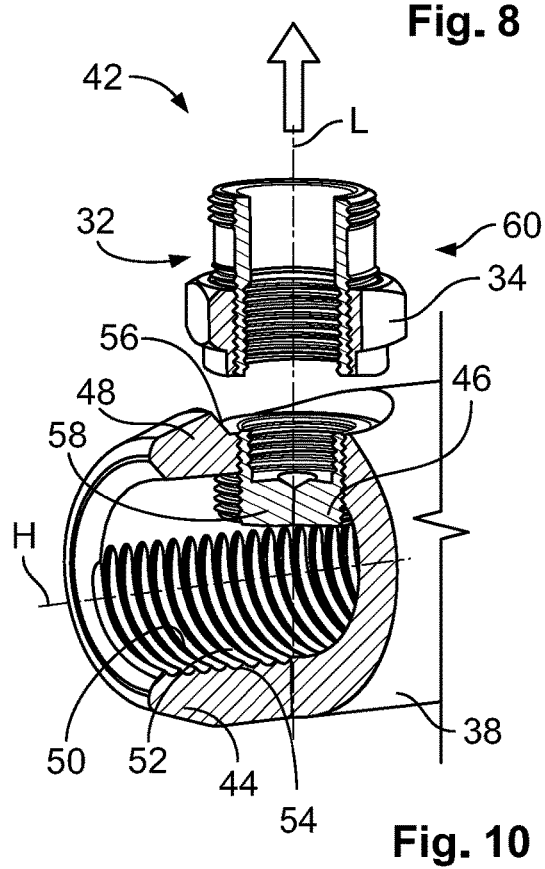
Figure 11:
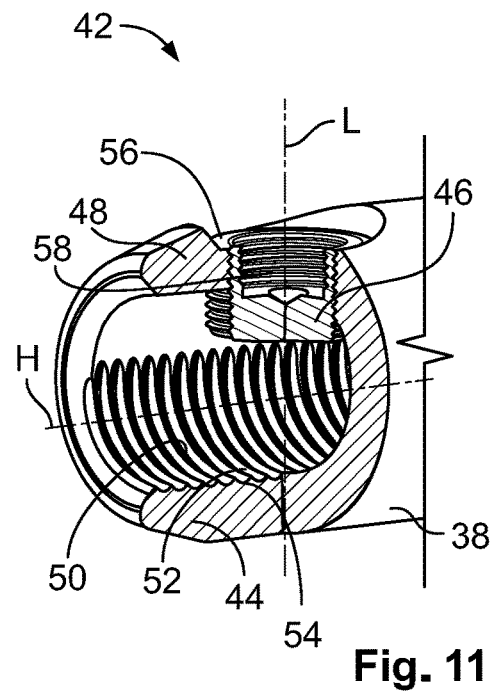

At the second thread section 4, the nut 34 may travel down until abutment with the outer surface 40 of the connector 38 (FIGS. 8 and 9). The at least one bore 46 may open into at least one depression 56 formed on the outer surface 40 of the connector 38. The depression 56 may be adapted to receive the nut 34, in this case the pedestal 36 of the nut 34. Therefore, the nut 34 can evenly abut the connector 38 at the entrance of the bore 46 allowing for a clean cut of the bolt 1. By further inducing a torque on the nut 34, the torque is transmitted to the bolt 1 subjecting the bolt 1 to tensile stress that leads to the breakage, especially shearing off of the bolt 1 at the interface of the nut 34 and the connector 38. The bolt 1 may be split into a remaining part 58, arranged in the bore 46, and protrude into the hollow space 50 pressing against the conductor 52 and into a removable part 60 that can be discarded (FIGS. 10 and 11). The nut may be arranged on the removable part 60 and can also be discarded. The remaining part 58 may not protrude out of the bore 46 towards the outer surface 40 of the connector 38. To reduce the risk of pulling the remaining part 58 out of the bore during shearing, the torque required for breaking the bolt 1 at the interface between thread section 4 and connector 38 may be lower than the predetermined torque.

Therefore, the bolt 1 enables the making of an easy and stable connection. The installation can be completed in a single installation step, wherein a torque is applied to the nut 34 until the bolt 1 is broken, while ensuring that the bolt 1 is installed with a predetermined torque. During installation, no severed parts have to be removed before the nut 34 can be further screwed down the bolt 1, which may be the case by having different torque-limiting features. Consequently, the installation efficiency can be greatly enhanced and for example be easily performed automatically.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A break-off assembly, comprising:
   a break-off bolt, comprising:
   (a) a first thread section and a second thread section, the first and the second thread section comprising the same external thread having a minor diameter; and
   (b) a torque-limiting section arranged between the first and second thread section and having no thread with an outer diameter larger than the minor diameter of the external thread; and
   a nut having internal threads,
   wherein a length of the torque-limiting section from the first thread section to the second thread section is less than a thickness of a nut threaded onto the first thread section or the second thread section,
   whereby the internal threads of the nut cut into the torque limiting section as the nut travels from the first thread section to the second thread section, a torque for breaking the break-off bolt is lower than a torque for overcoming the torque-limiting section.

2. The break-off bolt according to claim 1, wherein the torque-limiting section has an outer diameter smaller than a major diameter of the external thread of the first and second thread sections.

3. The break-off bolt according to claim 1, wherein the external thread of the second thread section is a continuation of the external thread of the first thread section.

4. The break-off bolt according to claim 1, wherein the torque-limiting section, the first thread section and the second thread section are formed integrally with one another as a monolithic component.

5. The break-off bolt according to claim 4, wherein the break-off bolt is hollow and defines an internal cavity.

6. The break-off bolt according to claim 5, wherein the cavity defines an internal thread.

7. The break-off bolt according to claim 6, wherein the internal thread of the cavity is formed at least partially at the second thread section.

8. The break-off bolt according to claim 6, wherein the internal thread extends opposite to the external thread.

9. A break-off assembly, comprising:
   a break-off bolt, including:
   a first thread section and a second thread section, the first and the second thread section comprising the same external thread with a minor diameter; and
   a torque-limiting section arranged between the first and second thread section and having no thread with an outer diameter larger than the minor diameter of the external thread; and
   a nut engaging the external thread, and having internal threads,
   wherein a length of the torque-limiting section from the first thread section to the second thread section is less than a thickness of the nut,
   whereby the internal threads of the nut cut into the torque limiting section as the nut travels from the first thread section to the second thread section, a torque for breaking the break-off bolt is lower than a torque for overcoming the torque-limiting section.

10. The break-off assembly according to claim 9, wherein the torque-limiting section has an outer diameter smaller than a major diameter of the external thread of the first and second thread sections.

11. The break-off assembly according to claim 9, wherein the external thread of the second thread section is a continuation of the external thread of the first thread section.

12. A contact assembly, comprising:
   a pipe-shaped connector having at least one bore extending through a wall of the connector;
   a break-off bolt sized to be installed through the at least one bore, including:
      a first thread section and a second thread section, the first and the second thread section comprising the same external thread with a minor diameter; and
      a torque-limiting section arranged between the first and second thread section, the torque-limiting section having a length along a longitudinal axis, and no thread with an outer diameter larger than the minor diameter of the external thread; and
   a nut having a thickness and internal threads,
   wherein the length of the torque limiting section is smaller than the thickness of the nut,
   whereby the internal threads of the nut cut into the torque limiting section as the nut travels from the first thread section to the second thread section, a torque for breaking the break-off bolt is lower than a torque for overcoming the torque-limiting section.

13. The contact assembly of claim 12, wherein the nut is a unitary metal nut.

\* \* \* \* \*